United States Patent
Gates et al.

(10) Patent No.: US 8,944,503 B2
(45) Date of Patent: Feb. 3, 2015

(54) CHILD SAFETY SEAT HARNESS TENSIONING DEVICE

(75) Inventors: Luther Gates, Honey Brook, PA (US); Fred Buckingham, Elkhart, IN (US); Mark Main, Bremen, IN (US)

(73) Assignee: Graco Children's Products Inc., Atlanta, GA (US)

( * ) Notice: Subject to any disclaimer, the term of this patent is extended or adjusted under 35 U.S.C. 154(b) by 695 days.

(21) Appl. No.: 13/145,805

(22) PCT Filed: Jan. 27, 2010

(86) PCT No.: PCT/US2010/022300
§ 371 (c)(1),
(2), (4) Date: Nov. 9, 2011

(87) PCT Pub. No.: WO2010/088317
PCT Pub. Date: Aug. 5, 2010

(65) Prior Publication Data
US 2012/0074758 A1    Mar. 29, 2012

Related U.S. Application Data

(60) Provisional application No. 61/147,656, filed on Jan. 27, 2009.

(51) Int. Cl.
*A47C 1/08* (2006.01)
*B60N 2/28* (2006.01)

(52) U.S. Cl.
CPC ............ *B60N 2/2812* (2013.01); *B60N 2/2851* (2013.01)
USPC ...... 297/256.15; 297/475; 297/470; 297/484; 297/476

(58) Field of Classification Search
CPC B60R 22/357; B60R 22/3405; B60R 22/105; B60N 2/2839; B60N 2/286
USPC ..................... 297/256.15, 475, 470, 484, 476
See application file for complete search history.

(56) References Cited

U.S. PATENT DOCUMENTS

| | | | | |
|---|---|---|---|---|
| 4,720,148 A | * | 1/1988 | Anthony et al. | 297/474 |
| 5,061,012 A | * | 10/1991 | Parker et al. | 297/467 |
| 5,398,997 A | | 3/1995 | McFalls | |
| 5,503,461 A | * | 4/1996 | Schreier | 297/484 |
| 5,549,356 A | * | 8/1996 | Gray | 297/256.15 |
| 5,779,319 A | | 7/1998 | Merrick | |

OTHER PUBLICATIONS

International Search Report and Written Opinion issued in corresponding International application No. PCT/US2010/022300.

* cited by examiner

*Primary Examiner* — Laurie Cranmer
(74) *Attorney, Agent, or Firm* — Lempia Summerfield Katz LLC

(57) ABSTRACT

A harness retractor (62) for a harness system (60) of a child safety harness, which has a tensioning web (80) and buckle connectors (70) coupled to straps of the safety harness. The tensioning device has a rotatable retractor mechanism (90) connected to the tensioning web (80) and biased to wind up the tensioning web in a wind up rotation direction. The tensioning device has a locking device (110) biased to a first position preventing rotation of the retractor mechanism in the wind up direction. The tensioning device has a buckle housing (64) coupled to the retractor mechanism. The buckle connectors (70) are releasably connectable to the buckle housing (64). A release mechanism is connected between the locking device (110) and the buckle housing (64) and can switch the locking device from the first position to a second position permitting rotation of the retractor mechanism in the wind up direction.

20 Claims, 10 Drawing Sheets

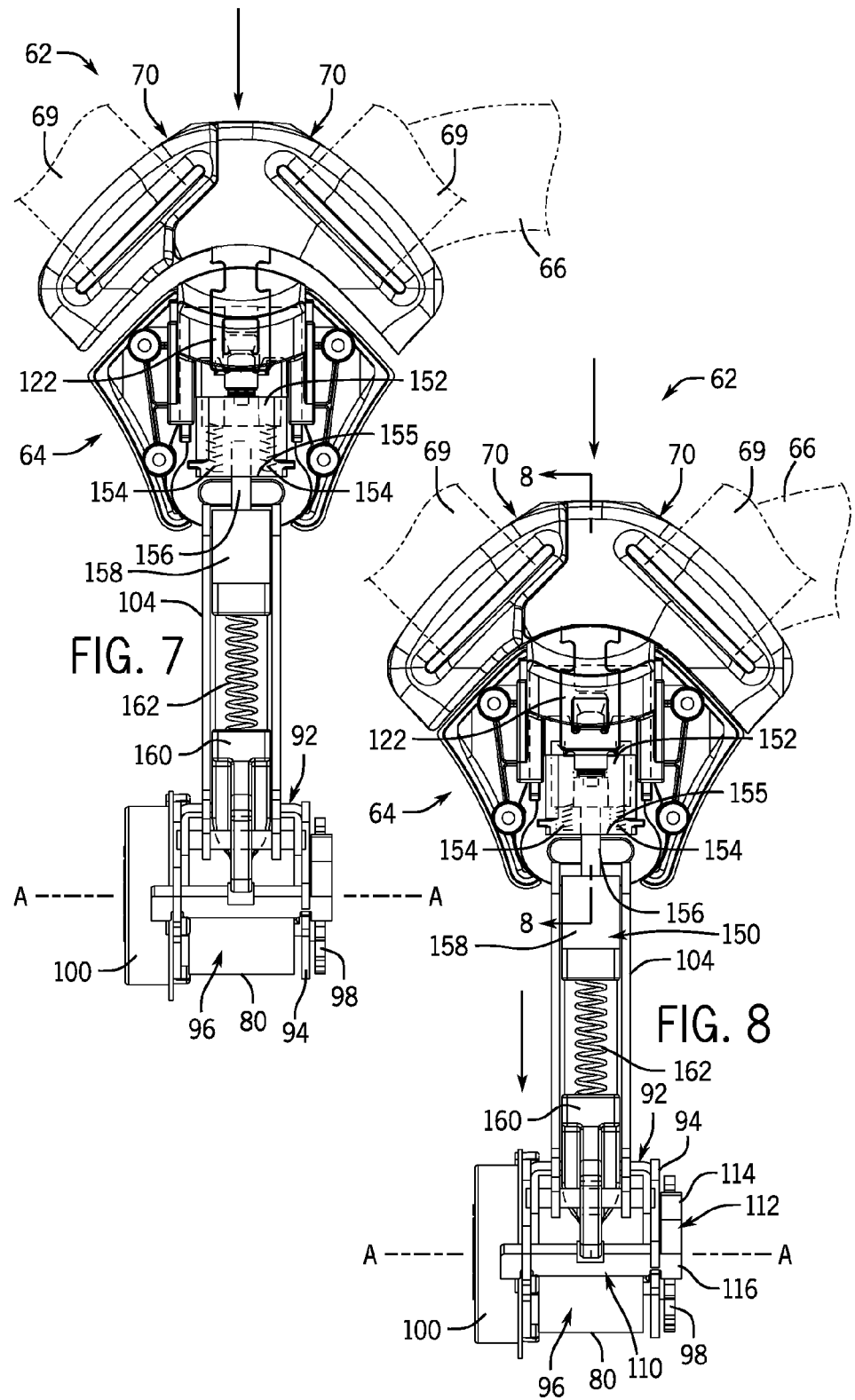

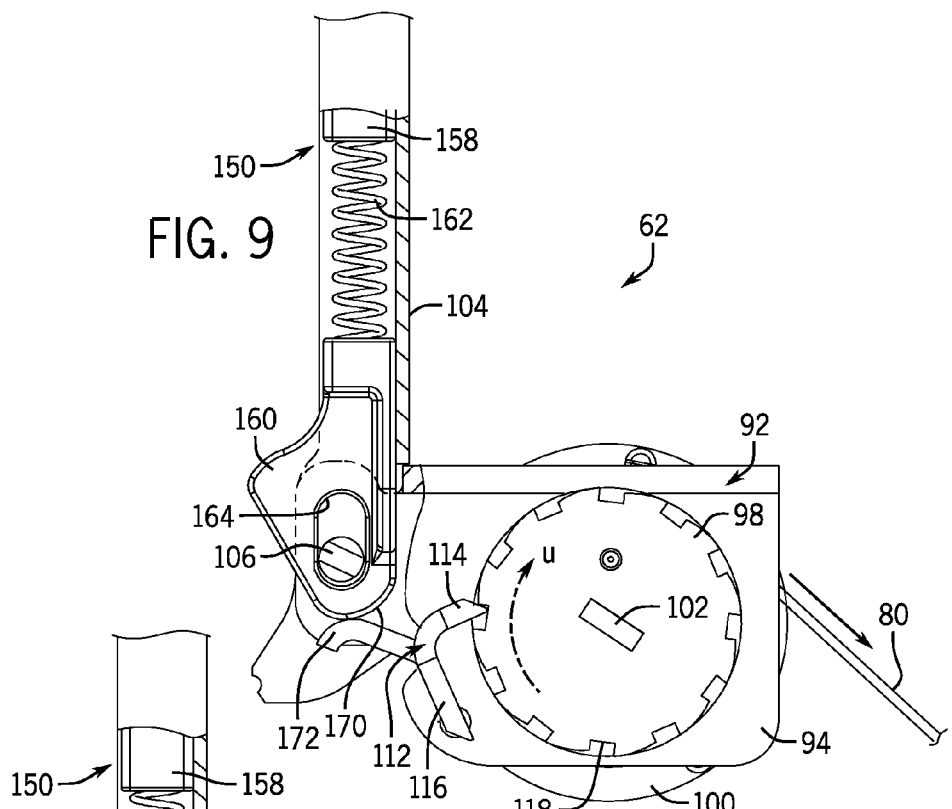
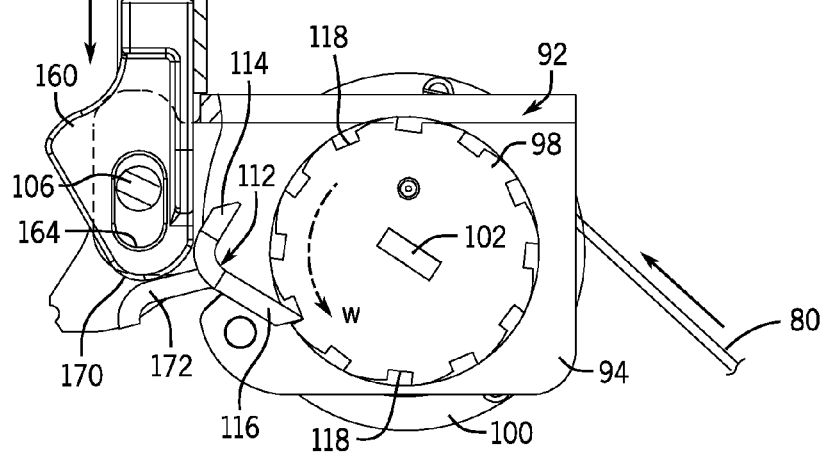

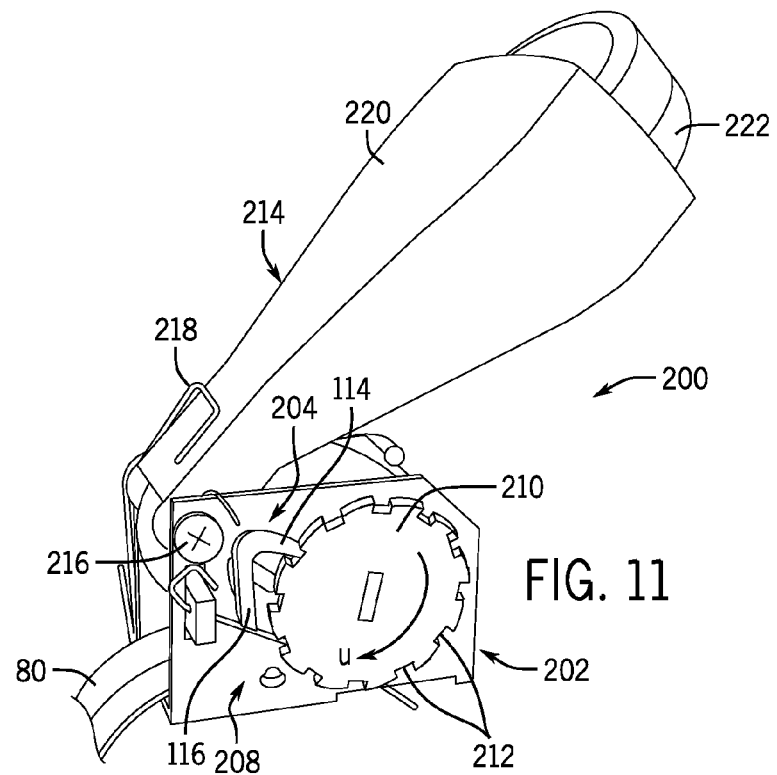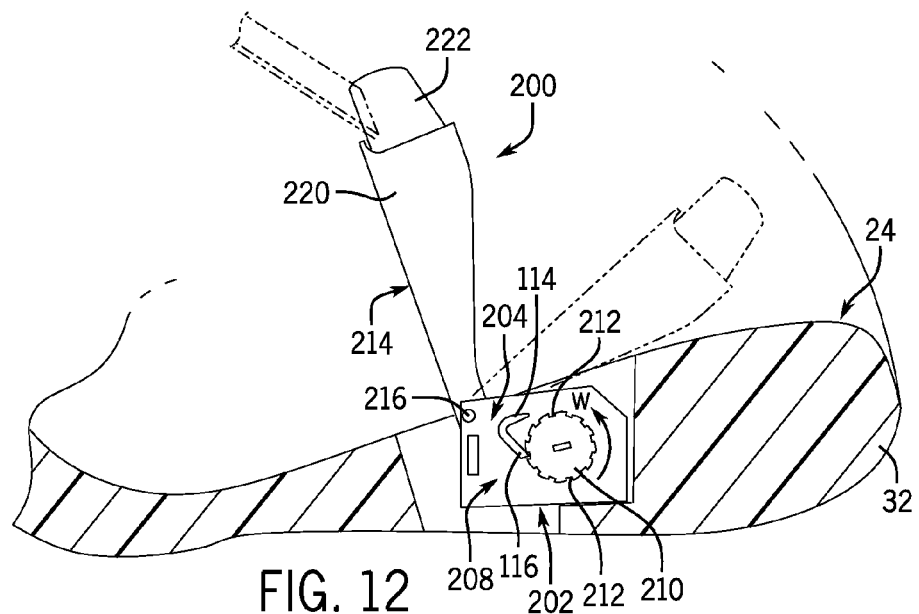

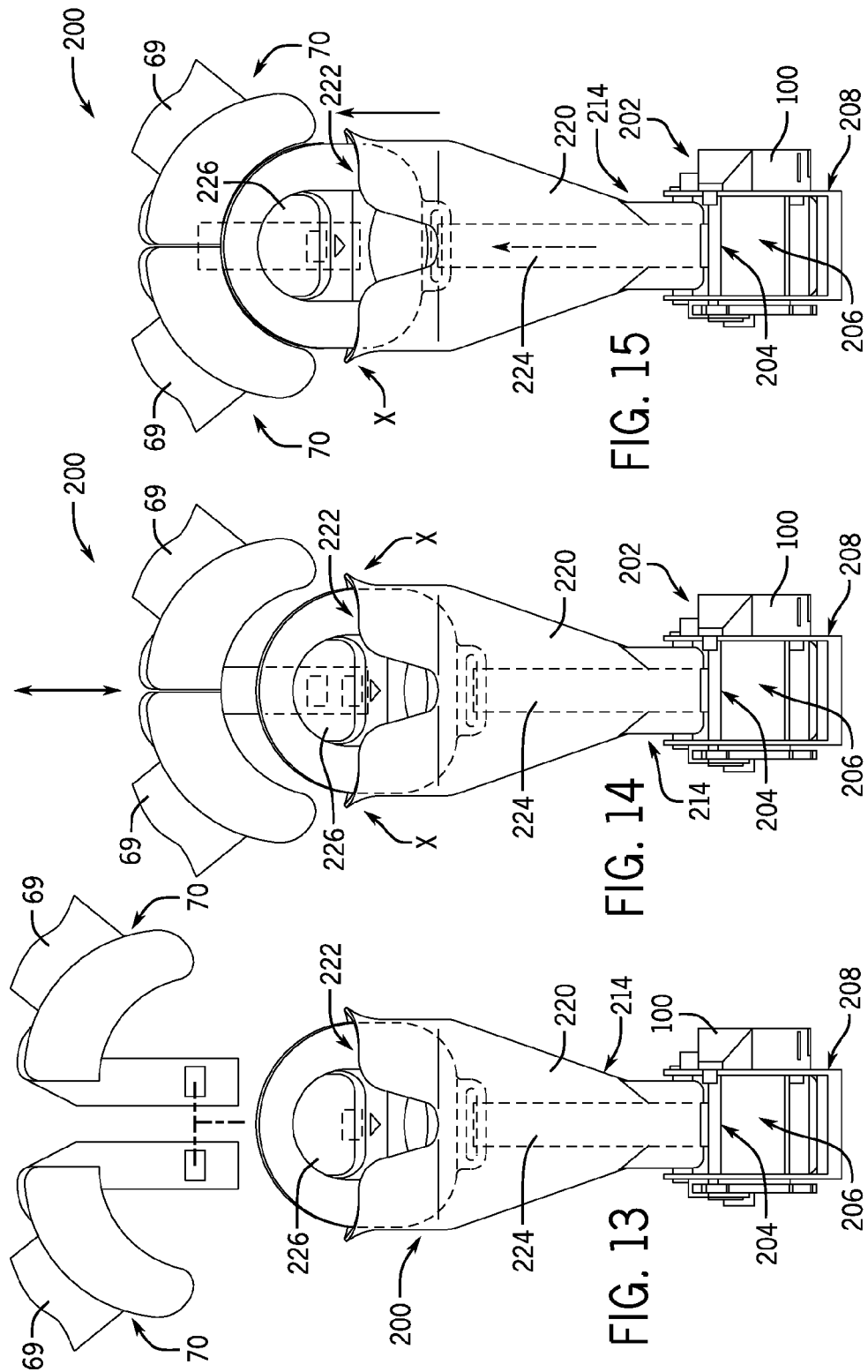

CHILD SAFETY SEAT HARNESS TENSIONING DEVICE

RELATED APPLICATION DATA

This patent is related to and claims priority benefit of U.S. provisional patent application Ser. No. 61/147,656 filed on Jan. 7, 2009 and entitled "Car Seat Harness and Adjustment Systems and Methods." The entire contents of this prior filed provisional application are incorporated herein by reference.

BACKGROUND

1. Field of the Disclosure

The present invention is generally directed to child safety seats, and more particularly to a harness retractor or tensioning device for a child safety seat harness system.

2. Description of Related Art

Child safety seats, or car seats, are well known for placement on a vehicle seat in order to safely position, secure, and restrain a child in the vehicle. Child safety seats are also well known to employ an on-board or dedicated harness system. A typical five-point harness system often employs a crotch strap, a pair of lap belts, and a pair of shoulder straps. The various straps and belts are connected to one another at a latch or buckle typically carried on the crotch strap. The length of the various straps and belts is adjustable in order to accommodate children of different size and to accommodate a growing child.

It is well known that parents do not always know how to correctly tension the harness system to properly and safely secure their child in a safety seat with the child restraint system of the seat. Car seats have been developed that attempt to simplify the tensioning of a harness or restraint system for the parent when securing their child in a car seat. Car seats have also been developed that attempt to make ingress and egress from the seat easier for the child and parent. Currently, most child restraint systems require the parent or caregiver to manually adjust a central harness strap at a central adjuster. Many parents have difficulty performing this manual harness tensioning operation correctly. It can be difficult on many car seats for the parent to seat or remove their child from the seat or for the child to seat or remove themselves. The size, location, and function of the various harness or restraint systems and components often hinder such ingress and egress.

Some manufacturers have tried to simplify these processes. However, invariably these products have resulted in significantly more complex restraint systems that even fewer parents can correctly use and operate. For instance, Romer has developed a "Click" harness, which makes an audible click when tensioned properly. However, it is difficult to hear, and still requires the parent to manually adjust the harness. The parent must also be aware of and pay attention for the click while trying to seat and secure their child.

SUMMARY

In one example, a harness system for a child safety seat has a tensioning web and buckle connectors coupled to straps of the harness system. A rotatable retractor mechanism is connected to the tensioning web and biased to wind up the tensioning web in a wind up rotation direction. A locking device is biased to a first position preventing rotation of the retractor mechanism in the wind up direction. A buckle housing is coupled to the retractor mechanism. The buckle connectors are releasably connectable to the buckle housing. A release mechanism is connected between the locking device and the buckle housing and is actuable to switch the locking device from the first position to a second position permitting rotation of the retractor mechanism in the wind up direction.

In one example, the locking device can prevent rotation of the retractor mechanism in a pay out direction opposite the wind up direction in the second position.

In one example, the locking device can permit rotation of the retractor mechanism in a pay out direction opposite the wind up direction when in the first position by manually pulling on the tensioning web.

In one example, the retractor mechanism can include a retractor spool rotatable about a shaft.

In one example, the release mechanism can include a plunger mechanism extending between the buckle housing and the retractor mechanism.

In one example, the release mechanism can include a plunger mechanism that can be spring biased upward toward the buckle housing and that can be pushed downward to switch the locking device to the second position when the buckle connectors are inserted into the buckle housing.

In one example, the release mechanism can include a plunger mechanism that can have a lower plunger body in contact with the locking device, a spring with one end coupled to the lower plunger body, and an upper plunger body coupled to the other end of the spring.

In one example, the release mechanism can include a plunger mechanism that can contact a block within the buckle housing. The block can be pushed down upon insertion of the buckle connectors into the buckle housing to switch the locking device to the second position.

In one example, the release mechanism can include a strap extending between the locking device and the buckle housing. The buckle housing can be pulled to pull on the strap such that the strap pulls the locking device to switch the locking device to the second position.

In one example, the buckle housing can be housed within a sheath and can be retractable into and extendable from the sheath.

In one example, the buckle housing can be extended from a sheath in order to fully insert the buckle connectors in the buckle housing.

In one example, the release mechanism can include a strap extending between the locking device and the buckle housing. Extending the buckle housing from a sheath can pull on the strap which switches the locking device to the second position.

In one example, the buckle housing can be is biased by a spring to a downward orientation when disengaged from the buckle connectors and can be movable against the bias of the spring to an upright orientation.

In one example, the buckle housing can be in the upright orientation in order to insert the buckle connectors in the buckle housing.

In one example, the retractor mechanism can include a retractor gear that rotates with the retractor mechanism in the wind up direction. The retractor gear can have a circumferential edge with a plurality of notches therein.

In one example, the locking device can include a pawl with first and second dogs angularly spaced apart from one another. The first dog can engage a notch in the retractor gear in the first position and the second dog can engage a notch in the retractor gear in the second position.

In one example, a harness retractor for a harness system of a juvenile product having a seat has a tensioning web of the harness system and buckle connectors coupled to straps of the harness system. A rotatable retractor mechanism is connected to the tensioning web and is biased to wind up the tensioning web in a wind up rotation direction. A locking device is biased to a first position preventing rotation of the retractor mechanism in the wind up direction. A buckle housing is coupled to the retractor mechanism. The buckle connectors are releasably connectable to the buckle housing. A release mechanism is connected between the locking device and the buckle housing and is actuable to switch the locking device from the first position to a second position permitting rotation of the retractor mechanism in the wind up direction.

BRIEF DESCRIPTION OF THE DRAWINGS

Objects, features, and advantages of the present invention will become apparent upon reading the following description in conjunction with the drawing figures, in which:

FIG. 7 shows the harness retractor shown in FIG. 6 and with the buckle connectors fully inserted into the buckle housing.

FIG. 8 shows a cross section taken along line 8-8 in FIG. 7 of the buckle housing portion of the harness retractor.

FIG. 9 shows a side, partial cutaway view of the retractor mechanism for the harness retractor in the configuration shown in FIG. 4 wherein the retractor mechanism is locked.

FIG. 10 shows the retractor mechanism shown in FIG. 9 but for the harness retractor in the configuration shown in FIG. 7 wherein the retractor mechanism is released.

FIG. 11 shows a rear and side perspective view of another example of a harness retractor constructed in accordance with the teachings of the present invention.

FIG. 12 shows a side view of part of a child safety seat including the harness retractor shown in FIG. 10, in phantom with the buckle connectors detached and with the buckle connectors attached.

FIG. 13 shows a front view of the harness retractor shown in FIG. 11 with the buckle connectors detached.

FIG. 14 shows a front view of the harness retractor shown in FIG. 13 with the buckle connectors partially inserted.

FIG. 15 shows a front view of the harness retractor shown in FIG. 14 with the buckle connectors fully inserted.

DETAILED DESCRIPTION OF THE DISCLOSURE

The present disclosure is generally directed to a child safety seat or car seat that employs a harness retractor or tensioning device to automatically tension the harness system when a child is secured in the seat. The disclosed child safety seat and harness retractors solve or improve upon one or more of the above noted and/or other problems and disadvantages with prior known child safety seats and harness or restraint systems. The disclosed harness retractors can help parents or caregivers to correctly adjust the tension of a harness to ensure that the harness system is properly tensioned each time a child is secured in the child safety seat or car seat. The aforementioned car seats and harness systems known in the prior art require a parent to manually adjust tension in the harness system. The parent may not always be aware of the proper tension for securing a child in the seat with the harness system. The disclosed harness retractors are intended to remove or reduce uncertainty and to ensure that a child is properly secured in a car seat. The disclosed harness retractors utilize mechanisms that will help one to properly set the harness tension to secure children of all sizes within the recommended height and weight range of the given seat.

Figure 1:
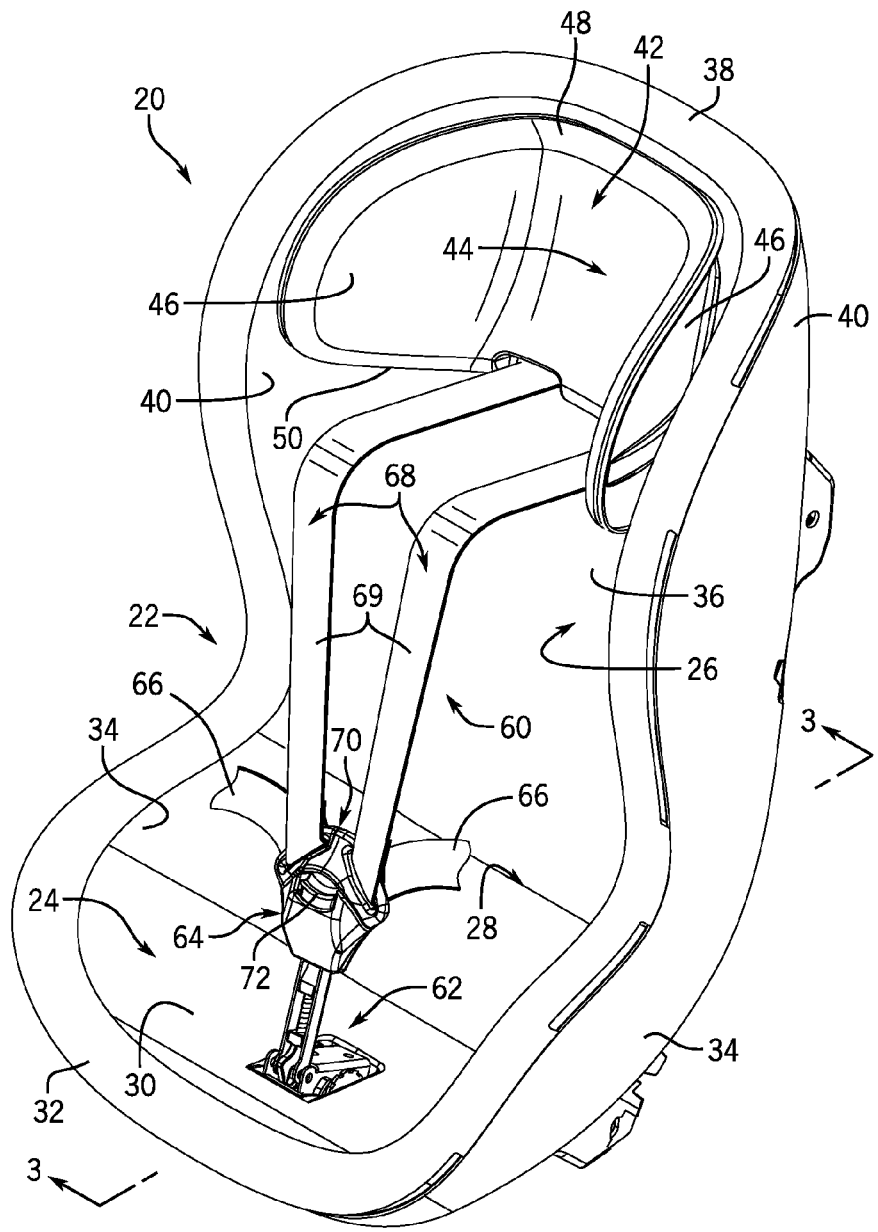
FIG. 1 shows a front perspective view of one example of a child safety seat with a harness retractor or tensioning device constructed in accordance with the teachings of the present invention.

Referring now to the drawings, FIG. 1 shows one example of a child safety seat 20 constructed in accordance with the teachings of the present invention. In this example, the child safety seat 20 has a seat shell 22 of a unitary construction. The seat shell 22 generally has a seat pan or seat bottom 24 joined to a seat back 26 at a seat bight region 28. The seat bottom 24 has a top or upward facing side 30, a front end 32, and a pair of upwardly extending side walls 34, which project upward from opposite sides of the seat bottom. The seat back 26 has a front facing side 36, an upper end 38, and a pair of side bolsters 40, which project forward from opposite sides of the seat back. The seat bottom 24 has a rear end and the seat back 26 has a lower end, which are joined integrally with one another at the seat bight 28 in this example.

As will become evident to those having ordinary skill in the art upon reading this disclosure, the particular configuration and construction of the various aspects of the child safety seat 20 and seat shell 22 can vary within the spirit and scope of the present invention. The shape, size, and configuration of the child safety seat 20 and the seat shell 22 can deviate from the example shown and described herein. In the disclosed example, the seat shell 22 can be a plastic, molded, unitary structure. In another example, the seat shell components can be separately formed and attached or connected to one another to form the seat shell 22, can be made of other materials, and/or can be formed using other suitable processes.

In this example, the child safety seat 20 has a headrest assembly 42 connected near the upper end 38 of the seat back 26. The headrest assembly 42 in this example has a head support section 44 with a front facing surface 45 positioned between a pair of side wings 46. The side wings project forward from the side edges of the head support section 44. The headrest assembly 42 also has a top 48 and a bottom 50. The front facing surface 45 faces forward in the same direction as the front facing side 46 on the seat back 26.

As with the seat shell 22, the configuration and construction of the headrest assembly 42 can vary considerably within the spirit and scope of the present invention. In one example, the child safety seat need not have a separate headrest assembly at all, but instead only the seat back 26. The various aspects of the headrest assembly 42 can deviate from the example shown and described herein. The headrest assembly 42 can also be a molded, plastic, unitary structure or can be formed as subcomponents and assembled afterwards. The size, shape, and configuration of the various aspects of the headrest assembly 42 can also be altered without departing from the spirit and scope of the invention.

The seat shell 22 is depicted herein without any soft goods in order to more easily illustrate the features and functionality of the present invention. In a typical example, a seat pad would be installed over the seat shell 22 and have a portion resting on the seat bottom 24 and the seat back 26. The seat pad would define a seating surface supported by the seat bottom 24 and seat back 26 on or against which an occupant would rest during use of the child safety seat 20. The seat pad can have multiple layers including combinations of a decorative fabric layer, a durable fabric layer, a comfortable fabric layer, padding, wadding, tufting, welting, and the like. Similarly, the headrest assembly 42 is shown herein without any soft goods, but can include same.

The child safety seat 20 in this example has an on-board or dedicated harness system 60 that is configured to secure an occupant in the seat during use. In the disclosed example, the harness system 60 generally has a harness retractor 62 in accordance with the teachings of the present invention. The harness retractor 62 takes the place of a crotch strap or crotch stalk of conventional harness systems of this type. The harness retractor 62 is coupled to and can extend up from the seat bottom 24. In general, the harness retractor 62 includes a buckle housing 64 carried near the top or free end of the harness retractor 62. The harness system 60 has a pair of continuous straps that, when installed, form a pair of lap belts 66 that also extends up from the seat bottom 24 near the side walls 34. The lap belts 66 continue into a pair of shoulder straps 68 with strap portions 69 that are positioned forward of the front facing side 36 of the seat back 26 and extend therealong. In this example, a buckle connector 70 is slotted and is slidably received on each of the continuous straps. The position of the buckle connector 70 defines the separation between each lap belt 66 and respective shoulder strap 68 and strap portion 69 when the harness system 60 is installed. The buckle connectors 70 latch to the buckle housing 64 as shown to secure the harness system. A release actuator 72 is provided on a face of the buckle housing 64 and can be actuated to release the buckle connectors 70 from the buckle housing 64.

Figure 2:
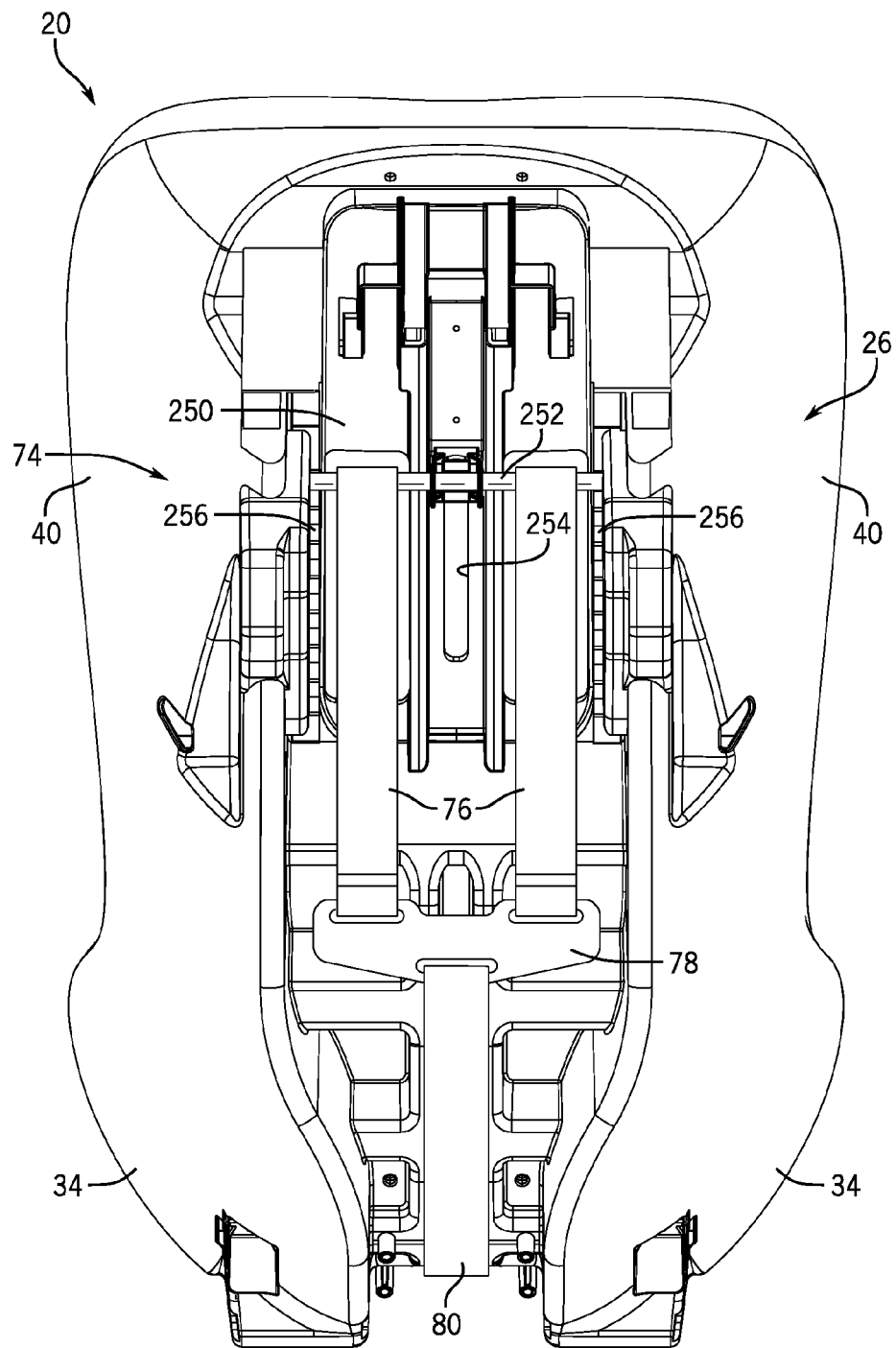
FIG. 2 shows a rear view of the child safety seat shown in the FIG. 1.
Figure 3:
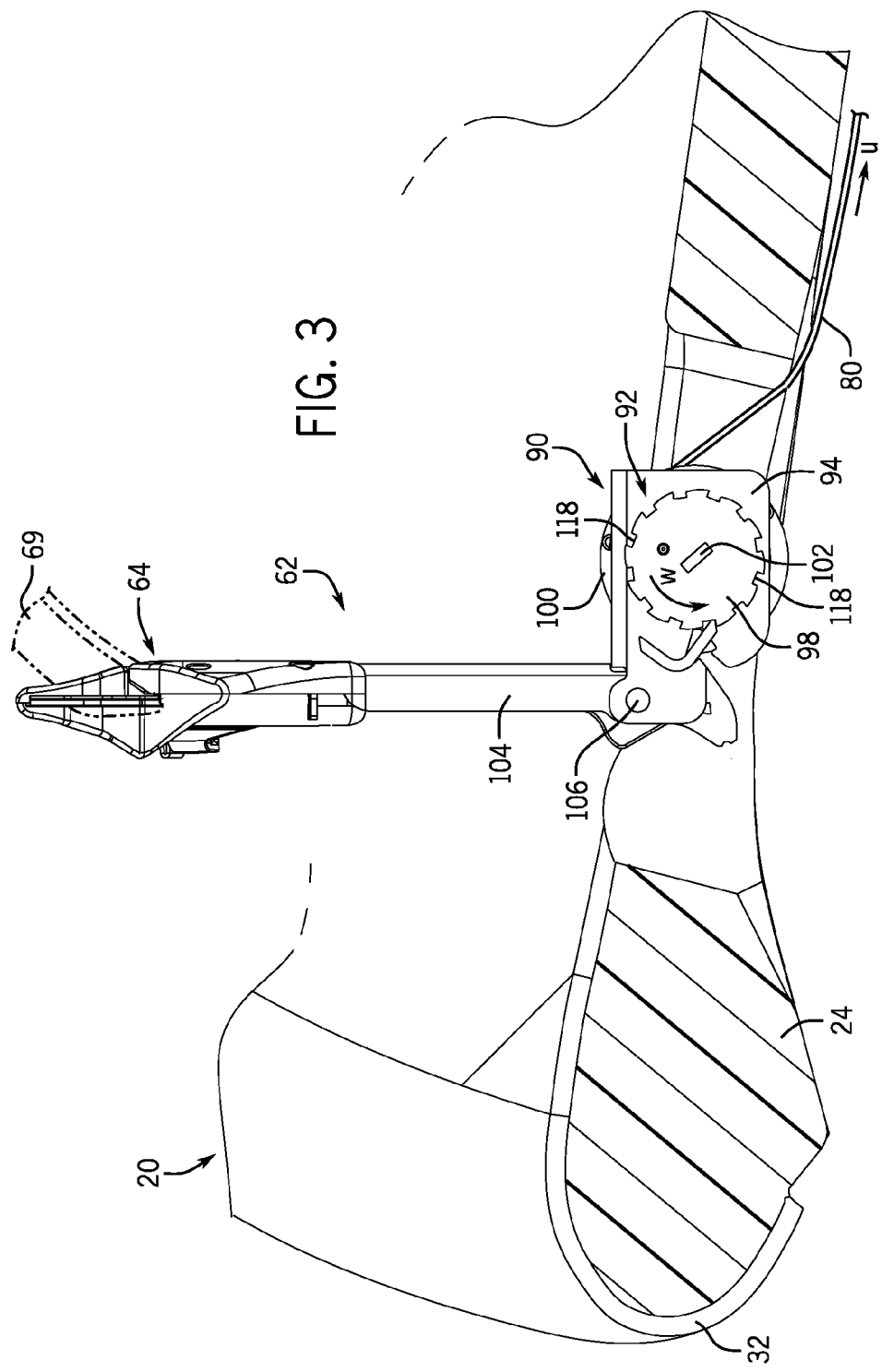
FIG. 3 shows a side view and partial cross section taken along line 3-3 in FIG. 1 of the harness retractor and part of the seat bottom of the child safety seat.

With reference to FIGS. 1 and 2, the strap portions 59 of the shoulder straps 58 extend through or over the top of the seat back 26 to a back side 74 of the seat back and continue to respective back portions 76 of the straps. The back portions 76 of the shoulder straps 68 extend down along the back side 74. The back portions 76 terminate at and are connected to a splitter plate 78. A single tensioning strap or webbing 80 is coupled to the bottom of the splitter plate 78 and extends down and under the seat bottom 24. As shown in FIGS. 2 and 3, the tensioning strap or webbing 80 passes through the seat bottom 24 near the front end 32 to the harness retractor 62. As discussed below, the harness retractor 62, when in a tensioning mode, i.e., is released or engaged, is configured to selectively wind up the tensioning strap or webbing 80 and apply tension to the harness system 60 through the tensioning strap. When the harness retractor 62 is in a locked mode, i.e., is locked or disengaged, the tensioning strap or webbing 80 can be paid out if and when desired to add slack to the harness system 60. In one example, the webbing can be paid out by pulling downward or forward on the strap portions 69 of the shoulder straps 68, such as by pulling on the buckle connectors 70.

The harness system 60 as disclosed herein, other than the harness retractor 62, is generally a conventional harness system in the form of a five-point harness system. Features of the harness system 60 that may deviate from a conventional system are discussed below in relation to the height adjustment aspects of the invention. Various features of the harness system 60 including the configuration and construction of the buckle housing 64 components, the buckle connectors 70, the release actuator 72, and the various straps and belts can vary within the spirit and scope of the present invention. A typical harness system employs woven fabric webbing to create strong yet flexible restraints for the child safety seat 20. The present invention requires that the straps be flexible, but the material from which the straps and belts are made can vary.

Figure 4:
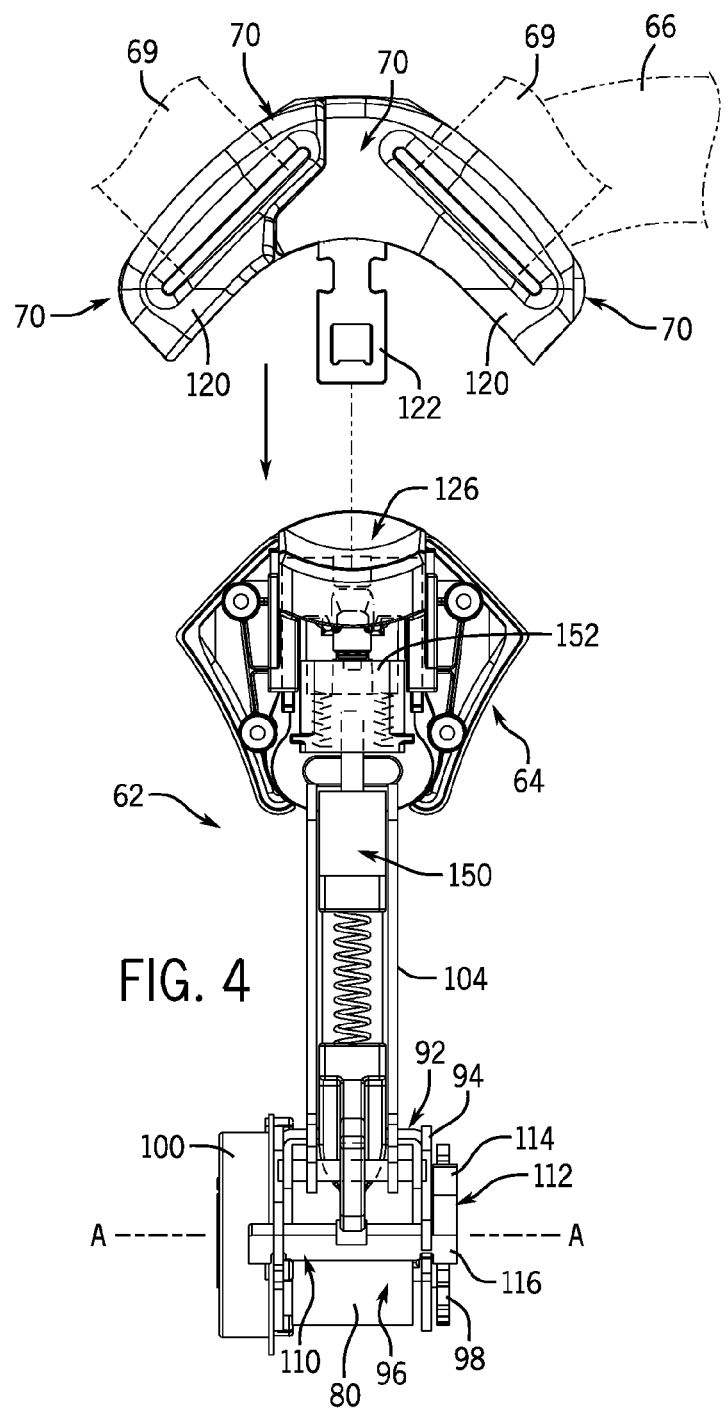
FIG. 4 shows a partial cutaway view of the harness retractor shown in FIG. 2 and with the buckle connectors removed from the buckle housing and mated with one another.
Figure 5:
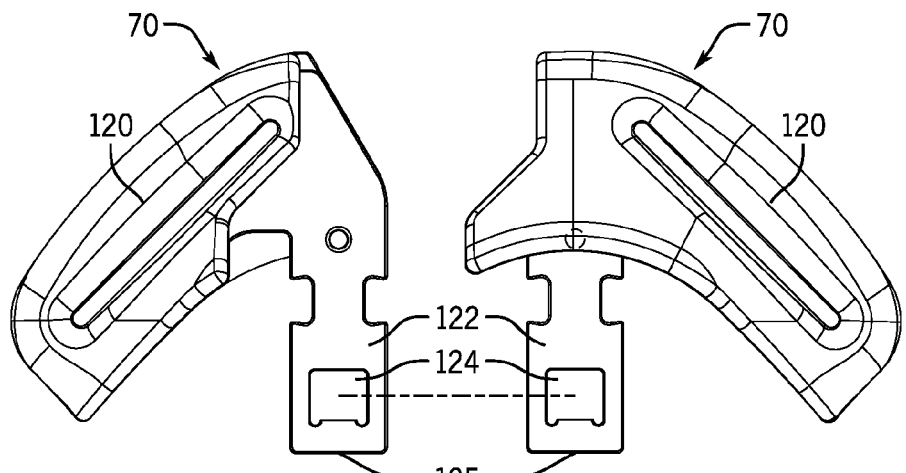
FIG. 5 shows the buckle connectors shown in FIG. 4 but separated from one another.

With reference to FIGS. 3-5, one example of a tensioning device or harness retractor in accordance with the teachings of the present invention is described and shown by referring to the harness retractor 62. In this example, the harness retractor 62 generally has a retractor mechanism 90 at its lower end. The retractor mechanism 90 includes a frame or support bracket 92 with a pair of side-to-side spaced apart side walls 94. The support bracket 92 is connected to the seat bottom 24 of the child safety seat 20 in this example. Though not shown in great detail herein, a spool 96 is positioned between the side walls 94 and is rotatable on a shaft 102 about a transverse axis A extending between the side walls. The tensioning strap or webbing 80 extends under the seat bottom 24, is connected to the spool 96, and is wound around the spool.

A circular disc or ratchet gear 98 is positioned on the outside of one of the side walls 94 and is mounted to one end of the shaft 102 for rotation with the spool 96 about the axis A. A spring cover 100 is mounted on the exterior side of the opposite side wall 94 and houses a torsion spring (not shown). The torsion spring is coupled to the spool 96 via the shaft 102. As shown in FIG. 3, the torsion spring is configured to wind up the tensioning strap or webbing 80 onto the spool 96 by force of the torsion spring in the direction of the arrow W.

The harness retractor 62 in this example also has a vertical stalk 104 that is connected to the frame or support bracket 92. As discussed below with respect to a second embodiment of the invention, the stalk 104 can be pivotally connected to the support bracket 92 if desired. In this example, the stalk 104 has a lower end connected via a pin 106 to the support bracket 92. An upper end of the stalk 104 carries the buckle housing 64 in this example. As discussed below, the buckle housing 64 is configured to releaseably engage each of the buckle connectors 70.

With reference to FIGS. 3 and 4, a pivotable locking device 110 is mounted to the support bracket 92 and extends between and is connected to the pair of side walls 94. One end of the locking device 110 extends to the exterior side of the side wall 94 adjacent the ratchet gear 98. A pawl 112 is carried on the one end and has a pair of dogs oriented at about 90° relative to one another. A first one of the dogs 114 is oriented or angled in an upward direction extending toward the ratchet gear 98 and a second one of the dogs 116 is oriented or angled in a downward direction extending toward the ratchet gear. As discussed in greater detail below, the locking device 110 can be actuated or moved so that a selected one of the dogs engages the ratchet gear 98. In this example, the circumference of the ratchet gear 98 includes a plurality of notches or teeth 118 spaced apart around the circumference of and protruding into the edge of the gear. The dogs 114, 116 can seat in any one of the notches 118 and permit rotation of the gear in one direction and prevent rotation in the opposite direction as is explained in greater detail below.

As shown in FIGS. 4 and 5, each of the buckle connectors 70 has a slotted coupling 120 slidably received on a respective one of the harness straps. Each of the buckle connectors 70 also has a buckle tongue 122 projecting downward therefrom. A plurality of latch and release components are housed within the buckle housing 64 on the harness retractor 62 and are configured to interact with the release actuator 72 and releasably engage the buckle tongues 122. A number of these components are also configured to interact with the retractor mechanism 90 in order to lock and release the retractor function.

Figure 6:
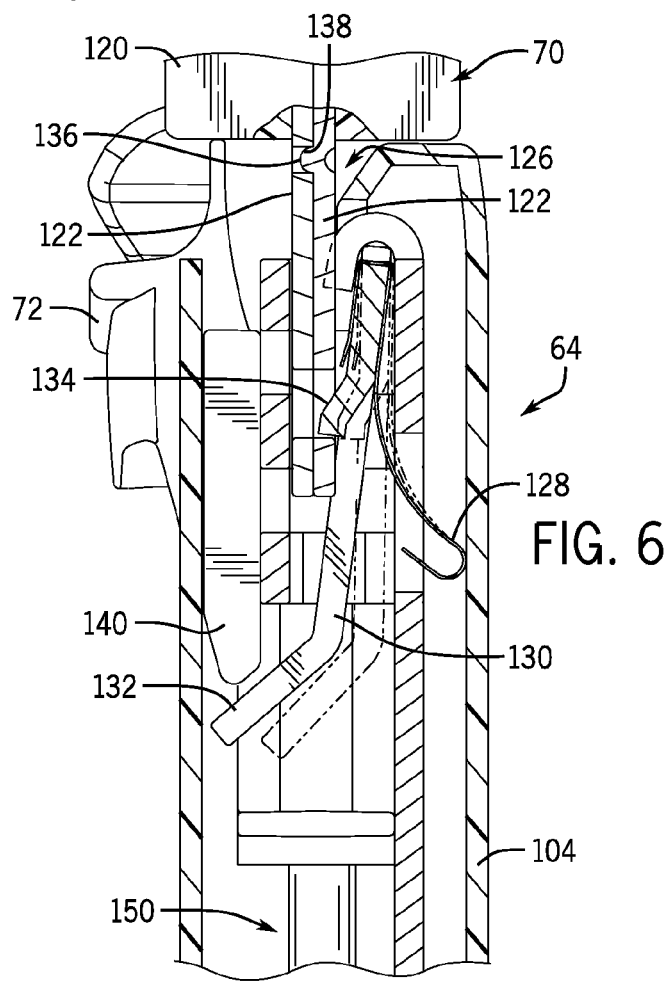
FIG. 6 shows the harness retractor shown in FIG. 5 and with the buckle connectors partially inserted into the buckle housing.

As shown in FIGS. 4 and 5, each of the buckle connectors 70 and buckle tongues 122 are configured to nest or mate with one another to be inserted into the buckle housing in this example. Each of the buckle tongues 122 is an elongate structure with an opening 124 near the distal end or tip 125 of the tongue. In this example, the openings 124 align with one another when the buckle connectors 70 are nested as shown in FIG. 4. A receptacle 126 is provided in the top of the buckle housing 64 for receiving the buckle tongues 122. As shown in FIG. 6, a latch spring 128 within the buckle housing 64 biases a latch lever 130 toward the release actuator 72. In this example, a latch lever 130 has a release leg 132 at the bottom that is angled upward and further toward the release actuator 72. The latch lever 130 also has a latch tang 134 that is biased into one or both of the openings 124 when the tongues 122 are inserted in the receptacle 126. The angle of the latch tang 134 is such that the tongues 122 can be inserted into the receptacle 126 with the latch lever in a latched position (see FIG. 6). However, the tang orientation interferes with the openings 124, once the tongues are inserted.

In this example, the tongues 122 are further integrated with one another by an interlock mechanism including a bump or protrusion 136 in one of the tongues and a corresponding detent or dimple 138 on mating surfaces of the tongues 122. When the tongues are mated to one another, the protrusion or bump seats in the dimple or detent as shown in FIG. 6. Other interlocking features and structures can also be utilized. The size of the receptacle can also aid in keeping the tongues engaged with one another so that one cannot be released unintentionally. In this example, the latch tang 134 as shown need only interfere with one of the openings 124. However, the tang or other structure can interlock or otherwise interfere with both of the openings or tongues if desired.

The release actuator 72 of a buckle latch mechanism in this example is slidable downward to a release position and is biased upward by a spring (not shown). A projection 140 on an inner surface of the release actuator 72 is positioned within the interior of the buckle housing 64. The projection 140 slides downward with the release actuator and contacts the release leg 132 of the latch lever 130 as shown in phantom in FIG. 6. Downward sliding of the release actuator 72 thus moved the latch lever 130 against the bias of the latch spring 128, which releases in the latch tang 134 from the openings 124. When the release actuator 72 is moved to the release position, the buckle connectors 70 and buckle tongues 122 are free to be removed from or exit the receptacle 126 in the buckle housing 64.

In a disclosed example, a plunger mechanism 150 extends vertically along the harness retractor 62 partly through the stalk 104 and partly into the buckle housing 64. With reference to FIGS. 4, 6, and 7, the plunger mechanism 150 in this example has an upper element or block 152 that is biased upward within the buckle housing 64 by one or more buckle release springs 154. The buckle release springs 154 are seated against a fixed stop surface 155 at their bottom ends and contact the block 152 at their upper ends. When the buckle connectors 70 and tongues 122 are inserted into the buckle housing receptacle 126, the bottom ends 125 of the tongues contact and pushed downward on the block 152. When the release actuator 72 is moved to the release position as described above, the buckle release springs 154 and block 152 will fire the buckle connectors 70 at least partially upward and out of the buckle housing receptacle, at least freeing the tongues from the buckle latch mechanism.

A central post 156 can also contact the block 152 or the ends 125 of the tongues 122. The post 156 is thus also moved downward when the tongues 122 are inserted into the buckle housing. As shown in FIG. 8, the post 156 bears against an upper plunger body 158 housed within and near the top of the stalk 104. As the post 156 is driven downward, the upper plunger body 158 is also driven downward. A lower plunger body 160 is housed within and near the bottom of the stalk 104 and a lost motion spring 162 is interposed between the two plunger bodies. As the upper plunger body 158 is driven downward, the spring 162 drives the lower plunger body 160 downward as well.

The spring 162 can be eliminated entirely, but can be provided to reduce shock and stress on the components during use. The spring can also add a slight delay between the harness buckle release function and the retractor function, if desired. Also, the various parts of the plunger mechanism can also vary considerably in configuration and construction and yet function as intended.

With reference to FIGS. 9 and 10, the lower plunger body 160 in this example has a vertically oriented slot 164 through which the stalk pin 106 passes. Thus, the lower plunger body is free to move vertically within the parameters of the slot length. The plunger body 160 terminates at a rounded or curved bottom end 170. This bottom end 170 contacts an actuation lever 172 on the locking device 110. The locking device 110 can be biased to an upward orientation as depicted in FIG. 9 by a spring (not shown). When the buckle connectors 70 and tongues 122 are inserted into the buckle housing receptacle 126, the bottom ends 125 of the tongues 122 push down on the block 152. This in turn pushes down on the post 156, which drives the upper plunger body 158 downward. The plunger body 158 pushes down on the spring 162, which further pushes down on and moves the lower plunger body 160 downward, which is permitted by the slot 164. As the lower plunger body 160 is pushed downward, the bottom end 170 pushes down on the actuation lever 172 of the locking device 110. This pivots the locking device and actuates the retractor mechanism 90.

FIG. 9 is representative of the harness retractor 62 wherein the harness system is in the locked mode or is locked or disengaged. This means that the buckle connectors 70 are removed from the buckle housing 64. In this condition, the plunger mechanism 150 is biased upward from the lower plunger body 160 all the way through to the block 152. In this condition, the locking device 110 is also biased by its spring in a forward orientation or position so that the first dog 114 seats in one of notches or teeth 118 in the ratchet gear 98. The first dog 114 and the notches 118 are configured such that the ratchet gear can rotate in an unwind or pay out direction indicated by the arrow U in FIG. 9. In this configuration, the torsion spring in the spring cover 100 of the ratchet mechanism 90 cannot rotate the ratchet gear in the opposite direction W, which motion is prevented by interference between the first dog 114 and a notch 118 on the gear.

FIG. 10 is representative of the harness retractor 62 where the harness system 60 is in the tensioning mode or is unlocked or engaged. This means that the buckle connectors 70 are inserted into the buckle housing 64 as described above. In this condition, the plunger mechanism 150 is biased downward from the block 152 all the way through to the lower plunger body 160 and the locking device 110. In this condition, the locking device 110 is pushed downward and rotated against its spring bias by contact between the bottom end 170 of the plunger body 160 and the actuation lever 172. This rotates the locking device 110 such that the first dog 114 releases from the ratchet gear 98 and the second dog 116 pivots into contact with the gear and seats in one of the notches 118. The second dog 116 and the notches 118 are again configured such that the ratchet gear can rotate in the wind up or retraction direction indicated by the arrow W in FIG. 10. In this configuration, the torsion spring of the ratchet mechanism 90 can rotate the spool 96 in the windup direction, but the spool cannot be rotated in the opposite direction U, which motion is prevented by interference between the second dog 116 and the gear 98. Thus, when the buckle connectors 70 are inserted in the buckle housing 64 thereby engaging the harness system 60, the harness retractor 62 will wind up slack in the tensioning strap 80 and tension the harness system automatically.

The torsion spring characteristics can be designed to apply an appropriate amount of tension to the harness system. By utilizing the above-described harness retractor 62, the harness system automatically tensions itself when the buckle connectors are attached to the buckle housing. The parent or caregiver is relieved of the responsibility of determining and attempting to adjust the tension of the harness system.

As will be evident to those having ordinary skill in the art upon reading this disclosure, the various components of the harness retractor 62 disclosed and described herein can vary within the spirit and scope of the present invention. The component details of the buckle latch and the retractor lock and release functions can vary considerably without significantly affecting the harness retractor functionality of the invention. Details of the buckle tongues, release actuator, receptacle, latch lever, latch springs, plunger mechanism, locking device, gear, spool, torsion spring, support bracket, stalk, and the like can differ from the embodiment disclosed and described above. The above embodiment is provided to illustrate aspects of the present invention, not to unnecessarily limit the scope thereof.

Turning now to FIGS. 11-16, a second embodiment of a harness retractor 200 is shown and described. In this example, only details that are significantly different from the earlier embodiment will be described. A retractor mechanism 202 in this example is substantially similar in construction and function to the mechanism 90 described earlier. A locking device 204 is also similar to the locking device 100 as described above and has first and second dogs 114, 116, respectively. The retractor mechanism 202 in this example also has a spool 206 mounted to and supported by a support bracket 208. The tensioning strap 80 is again wound around the spool 206 in this example. The retractor mechanism 202 also employs a ratchet gear 210 with notches of 212 on its circumferential edge, which selectively engage the dogs 114, 116 in essentially the same manner as described above.

The actuation of the locking device 204 is achieved in a different manner. Further, the harness retractor 200 in this example has a stalk 214 that is pivotally connected at a pin 216 to the support bracket 208. A torsion spring 218 is coupled to the support bracket 208 and the stalk 214 and biases the stalk downward and forward when disengaged from the harness system 60, as shown in FIG. 11 and in phantom in FIG. 12. Biasing the harness retractor 200 forward in this manner makes ingress and egress to and from the child safety seat 20 easier by providing greater clearance at the seat bottom. When a user wishes to engage the harness system 60, a user can manually rotate the harness retractor 200 from the forward biased position to an upright position as shown in FIG. 12.

As mentioned previously, the earlier example of the harness retractor 62 can also be pivotable and biased in this manner. In the earlier example, the stalk 100 would be pivotable rearward away from the support bracket 92. In this second example, a harness retractor 200 pivots over the top of the support bracket 208.

As shown in FIGS. 13-15, in this example the stalk 214 of the harness retractor 200 has an external sheath 220 that is connected to the support bracket 208 and fitted around a buckle housing 222. In this example, the buckle housing 222 is connected by a release strap 224 to the locking device 204 and can be retracted into and extended partially from the sheath 220. With the buckle connectors 70 disengaged from the buckle housing 222 in this example, the buckle housing drops or retracts downward into the sheath 220 as shown in FIG. 13. The release strap 224 in this condition is loose and does not pull up on the locking device 204. Thus, a spring (not shown) will bias the locking device 204 so that the first dog 114 is pivoted toward the gear 210 and seats in one of the notches 212 (see FIG. 11). In this configuration, the spool 206 is prevented from rotating in the windup direction W and instead can only rotate in the unwind or pay out direction U.

In this example, the buckle connectors 70 cannot be inserted into the buckle housing 222 with the buckle housing nested downward into the sheath 220. A portion of the slotted coupling 120 on each connector 70 will interfere at X with a portion of the sheath 220 preventing full insertion of the buckle connectors (see FIG. 14). In order to fully engage the harness system 60 and install the buckle connectors 70, the user must first pull or extend the buckle housing upward out of the sheath 220 to eliminate the interference (see FIG. 15). In order to release the buckle connectors 70 from the buckle housing 222, a user can actuate a release actuator 226 on the buckle housing, which can function as previously described with respect to the release actuator 72 of the buckle housing 64.

Figure 16:
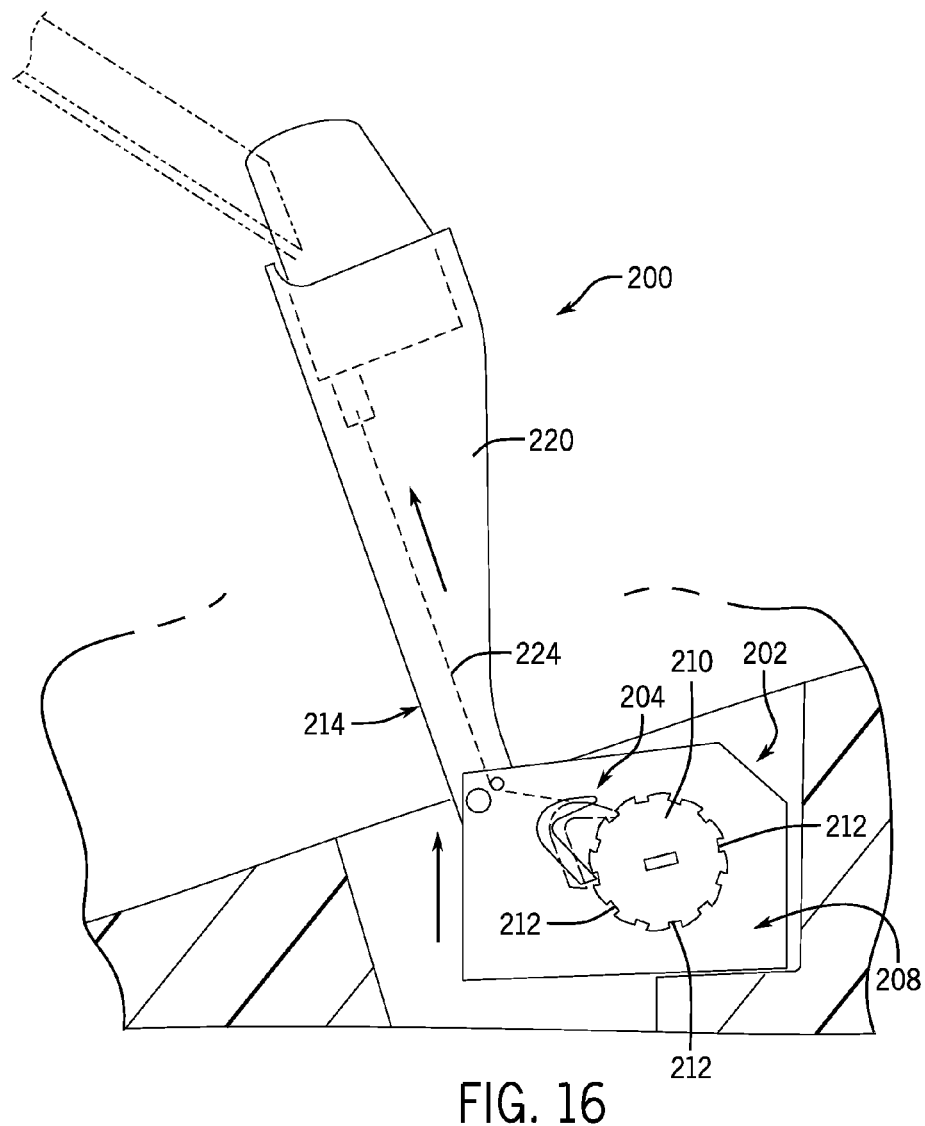
FIG. 16 shows a schematic side view of the actuation mechanism of the harness retractor shown in FIGS. 11-15.

In this example, to change the harness retractor 200 from the locked or disengaged mode depicted in FIGS. 11 and 13, the user must engage the buckle connectors 70 with the harness retractor 200 in an upright position as depicted in FIGS. 12 and 15. By pulling upward on the buckle housing 222 in order to fully engage the buckle connectors 70, the user also is pulling upward on the release strap 224. By doing so, the release strap 224 pulls the locking device 204 and switches the locking device from the first position to the second position, as described previously. This is similar to, but in functions in an opposite direction than the previous locking device 110 which was pushed down to switch modes. When the release strap 224 pulls the locking device upward, the first dog 114 is released from the gear 210 and the second dog 116 engages the gear and seats in one of the notches 212. This switches the harness retractor 200 to the tensioning mode and allows the torsion spring (not shown) to wind up the spool 206 and web 80 in the direction of the arrow W, thereby preventing the spool from rotating in the opposite direction U. FIG. 16 schematically shows the release strap 224 actuating the harness retractor 200 as described above.

As with the earlier example, the configuration and construction of the harness retractor 200 can vary from the example shown and described. The retractor mechanism, locking device, spool, support bracket, gear, stalk, sheath, buckle connectors, and the like can vary within the spirit and scope of the present invention and yet function as intended. The invention is not intended to be limited to the particular example of the harness retractor 200 or the earlier described harness retractor 62. These examples are provided herein for illustration purposes and are not intended to limit the scope of the invention only to those examples.

As noted above, the child safety seat 20 described herein can employ a headrest assembly 42, if desired. In addition, the headrest assembly 42 can be vertically adjustable relative to the seat back 26. And in addition, the shoulder straps 68 and the attached to a portion of the headrest 42 can also be vertically adjustable therewith. The disclosed harness retractors 62 and 200 can be employed on such a child safety seat to both automatically tension the harness system 60 and automatically position both the headrest 42 and the height of the shoulder straps 68.

With reference to FIG. 2, the headrest 42 can have a carriage 250 on the back side 74 with a transverse bar 252 carried by the carriage. The bar can be biased away from the seat back. The headrest can also be mounted via the carriage 250 through a slot 254 in the seat back 26. The headrest can be spring biased upward but movable downward along the slot 254. The shoulder straps 68 can be routed over the bar, which can travel up or down with the headrest. Notched racks 256 can be mounted to the back side 74 of the seat back 26. The bar can seat in any one of the notches in the racks 256, depending on the headrest height. The belt tension applied by the tensioning web 80 can pull the headrest down. When the strap portions 69 contact a child's shoulders, the strap portions will rotate up. As the tension increases, the bar will be pulled forward against its own spring bias into one of the adjustment notches in the racks 256. The automatic harness retractors can apply the tension as describe herein. Using this combination, the headrest height, shoulder strap height and harness tension can all be adjusted properly and automatically.

The disclosed harness retractors described above may also be operated by or include a timed actuation mechanism in which the retractor will switch to the tensioning mode at a specified time after the buckles are secured. Another option may include a secondary device connected to harness the retractor, such as a button or switch activated by the user, which then switches the retractor to the desired mode.

In a first mode, a child is not secured in the child safety seat by the harness system on the seat. In either example, the stalk of the harness retractor can be pivoted forward and down (see FIGS. 11 and 12). In this mode, the buckle tongues 122 on the harness straps are not clicked into the buckle housings 64 or 122 or body. The stalk and sheath can be spring biased to flip forward and away from the child, which can aid ingress and egress of the child from the child restraint system and the seat. While the harness retractor is in this mode, the locking device first dog is spring biased to engage the teeth of the retractor wheel or gear. This can prevent the retractor wheel or gear from rotating and thus prevent the retractor spring, such as a torsion spring, from applying any load to the harness tensioning web. This feature can be designed to allow the harness webbing to be paid out from the retractor, adding slack to the harness and thus aiding ingress and egress. In the first mode of operation, the automatic harness retractor over-rides the retractor torsion spring.

In the second mode of operation, the child is secured by the harness straps of the restraint system in the seat. In this mode, the buckle tongues 122 are clicked into the buckle housings 64 or 122. This switches the harness retractor to the tensioning mode, which then automatically tensions the harness webbing. In this mode the first dog 114 is released from the retractor wheel or gear and th second dog 116 engages the gear.

The automatic harness retractor, buckles, and webbing can be fabricated and/or assembled by one manufacturer, such that the entire assembly can be readily installed into the child safety seat. The harness retractor can be designed to fit within a cavity in the seat shell. This can aid in structurally supporting the mechanism and protecting the mechanism from the child's environment. Such positioning also can allow for the harness webbing to be looped behind the seat shell and out of the way of the child. This positioning can also allow for the seat shell to be reclined independent of the car seat base to which the child safety seat might be attached without losing tension on the harness system.

While shown being employed on a forward facing seat, the disclosed systems and retractors may be equally applicable for all child restraint systems, car seats, carriers, and the like. Also, as evidenced by the harness retractor 62, the forward biased spring on the stalk of the device 200 need not be employed.

The spring biased retractor function could alternatively be replaced by a one-way cam (central harness adjustor or A-Lok), which may be activated by the buckle housing or body being pulled upwards. One of the dogs of the locking bar or device may be replaced or eliminated as well for the first mode of operation. Eliminating this feature may allow the retractor mechanism to function as a typical automotive automatic locking retractor that is activated via the buckle motion. This may not be preferable in that the harness would then always be spring biased to pull the webbing into the retractor, making child ingress and egress potentially more difficult or awkward. The stalk sheath 220 of the second example may also be replaced or eliminated. However, having the sheath in place can help to ensure that the buckle body is pulled upwards to engage the automatic locking retractor feature. Without the stalk sheath, it may be possible for the second harness retractor example that the mechanism stays in the first mode (webbing pay-out) and allow the child to undesirably escape from the harness. This could be remedied by replacing the sheath with some other blocking/releasing device.

In another alternate example, the disclosed harness retractors may be replaced by a double-sided cam mechanism. The harness can still be tensioned by a wound torsion spring that is biased to retract the harness webbing. The double-sided cam can allow the same two modes of operation discussed above. However, the retractor's locking device and gear may not be required in such an example. The surface of the cam can prevent webbing from being paid out of the retractor mechanism. Since the cam would have two surfaces that are optionally selectable or switchable between the two modes of operation, the surfaces could be in an opposing orientation. The webbing can then be released in only one direction at a time. The switching or selecting mechanism for the mode selection can operate in a manner similar to that previously described herein, except that the modes could be switch using other alternate methods and devices as well.

In another example, an external adjustment knob could be employed that allows the parent or caregiver to manually tension the retractor while in the second mode of operation. Numerous tension indicators could be incorporated to assure the parent or caregiver that the harness system is properly tensioned during the second mode of operation, i.e., when their child is secured in the seat via the child restraint harness.

Combining the disclosed harness tensioner/retractor concepts with the above-mentioned automatic harness height and headrest height adjust features can provide a unique and improved child restraint system over the known systems. In such an example, the harness retractor can have a mechanism connected to the buckle that, when unbuckled, would allow the parent to pull the harness to create slack in the harness. This in turn allows the parent to place the child in the seat and correctly position the harness straps. When buckled, the mechanism can switch the retractor to a tensioning mode. This can cause the harness system to tighten and pull the headrest assembly downward, locking in place at the correct shoulder strap height for the child, as mentioned above.

The harness retractors could be alternatively activated by a variety of methods. These methods include, but are not necessarily limited to: a) a time delay mechanism such that, at a specified time period after the buckle tongues are engaged, the retractor mechanism spools the harness system until the proper tension is achieved; 2) a secondary action connected to the retractor, such as a button or switch, that can be activated by the parent, and that can switch the retractor to either mode as desired locked or released mode; and 3) a spring loaded buckle biased downward and out of the way of the child that, when a parent flips the buckle up to an upright position to insert the buckle tongues, activates the retractor.

Such combination systems can make it easier for a parent to correctly and repeatedly secure their child in the car seat each and every time. The height of the shoulder straps of the harness would be at a correct position based on the child's size. Such a combination system can sense the height of the headrest by a variety of methods. These methods could include, but are not necessarily limited to: 1) the above described headrest and shoulder strap height adjust methods and devices; 2) a pressure sensing mechanism; 3) a motion sensing/activated mechanism to spool the webbing to adjust tension and height; 4) an optical recognition device to spool the webbing to adjust tension and height; 5) a shut off device at the shoulder position, which can be achieved and/or activated via optical recognition or mechanical means such as a toggle switch or a lever (i.e., as used in commercial paper towel dispensers or the like). The disclosed examples can aid parents that might not otherwise know the ideal harness height and/or belt tension for securing their child in a car seat. The disclosed examples can automatically spool the harness webbing to the correct tension and position for a child in the seat. Known solutions require some type of manual adjustment for the harness height, belt tension, or both.

Although certain harness systems, retractors, and tensioning devices have been described herein in accordance with the teachings of the present disclosure, the scope of coverage of this disclosure is not limited thereto. On the contrary, this disclosure covers all embodiments of the teachings of the disclosure that fairly fall within the scope of permissible equivalents.

What is claimed is:

1. A harness system for a child safety seat, the harness system comprising:
   a tensioning web;
   buckle connectors coupled to straps of the harness system;
   a rotatable retractor mechanism connected to the tensioning web and biased to wind up the tensioning web in a wind up rotation direction;
   a locking device biased to a first position preventing rotation of the retractor mechanism in the wind up direction;
   a buckle housing coupled to the retractor mechanism, the buckle connectors releasably connectable to the buckle housing; and
   a release mechanism connected between the locking device and the buckle housing and actuable to switch the locking device from the first position to a second position permitting rotation of the retractor mechanism in the wind up direction.

2. A harness system according to claim 1, wherein the locking device prevents rotation of the retractor mechanism in a pay out direction opposite the wind up direction in the second position.

3. A harness system according to claim 2, wherein the locking device permits rotation of the retractor mechanism in the pay out direction opposite the wind up direction when in the first position by manually pulling on the tensioning web.

4. A harness system according to claim 1, wherein the locking device permits rotation of the retractor mechanism in a pay out direction opposite the wind up direction when in the first position by manually pulling on the tensioning web.

5. A harness system according to claim 1, wherein the retractor mechanism includes a retractor spool rotatable about a shaft.

6. A harness system according to claim 1, wherein the release mechanism includes a plunger mechanism extending between the buckle housing and the retractor mechanism.

7. A harness system according to claim 6, wherein the plunger mechanism is spring biased upward toward the buckle housing and is pushed downward to switch the locking device to the second position when the buckle connectors are inserted into the buckle housing.

8. A harness system according to claim 6, wherein the plunger mechanism includes a lower plunger body in contact with the locking device, a spring with one end coupled to the lower plunger body, and an upper plunger body coupled to the other end of the spring.

9. A harness system according to claim 6, wherein the plunger mechanism is in contact with a block within the buckle housing, the block being pushed down upon insertion of the buckle connectors into the buckle housing to switch the locking device to the second position.

10. A harness system according to claim 1, the release mechanism includes a strap extending between the locking device and the buckle housing, wherein the buckle housing is pulled to pull on the strap and the strap pulls the locking device to switch the locking device to the second position.

11. A harness system according to claim 1, wherein the buckle housing is housed within a sheath and is retractable into and extendable from the sheath.

12. A harness system according to claim 11, wherein the buckle housing must be extended from the sheath to fully insert the buckle connectors in the buckle housing.

13. A harness system according to claim 12, wherein the release mechanism includes a strap extending between the locking device and the buckle housing, wherein extending the buckle housing from the sheath pulls on the strap which switches the locking device to the second position.

14. A harness system according to claim 1, wherein the buckle housing is biased by a spring to a downward orientation when disengaged from the buckle connectors and is movable against the bias of the spring to an upright orientation.

15. A harness system according to claim 14, wherein the buckle housing must be in the upright orientation to insert the buckle connectors in the buckle housing.

16. A harness system according to claim 1, wherein the retractor mechanism includes a retractor gear that rotates with the retractor mechanism in the wind up direction, the retractor gear having a circumferential edge with a plurality of notches therein.

17. A harness system according to claim 16, wherein the locking device includes a pawl with first and second dogs angularly spaced apart from one another, the first dog engaging a notch in the retractor gear in the first position and the second dog engaging a notch in the retractor gear in the second position.

18. A harness system according to claim 1, wherein the locking device prevents rotation of the retractor mechanism in a pay out direction opposite the wind up direction in the second position.

19. A harness system according to claim 18, wherein the locking device permits rotation of the retractor mechanism in a pay out direction opposite the wind up direction when in the first position by manually pulling on the tensioning web.

20. A harness retractor for a harness system of a juvenile product having a seat, the harness retractor comprising:
- a tensioning web of the harness system;
- buckle connectors coupled to straps of the harness system;
- a rotatable retractor mechanism connected to the tensioning web and biased to wind up the tensioning web in a wind up rotation direction;
- a locking device biased to a first position preventing rotation of the retractor mechanism in the wind up direction;
- a buckle housing coupled to the retractor mechanism, the buckle connectors releasably connectable to the buckle housing; and
- a release mechanism connected between the locking device and the buckle housing and actuable to switch the locking device from the first position to a second position permitting rotation of the retractor mechanism in the wind up direction.

* * * * *